United States Patent [19]
Komine

[11] 3,968,504
[45] July 6, 1976

[54] INTERCHANGEABLE LENS BARREL STRUCTURE

[75] Inventor: Yoshio Komine, Tokyo, Japan

[73] Assignee: Canon Kabushiki Kaisha, Tokyo, Japan

[22] Filed: Aug. 16, 1974

[21] Appl. No.: 498,041

[30] Foreign Application Priority Data
Aug. 28, 1973 Japan.............................. 48-96503

[52] U.S. Cl................................. 354/46; 354/286
[51] Int. Cl.²........................................... G03B 7/20
[58] Field of Search ........... 354/202, 270, 272, 286, 354/46

[56] References Cited
UNITED STATES PATENTS

| | | | |
|---|---|---|---|
| 3,486,434 | 12/1969 | Suzuki | 354/46 |
| 3,722,390 | 3/1973 | Schlapp | 354/270 |

FOREIGN PATENTS OR APPLICATIONS

| | | | |
|---|---|---|---|
| 401,592 | 9/1968 | Australia | 354/46 |
| 288,180 | 5/1953 | Switzerland | 354/286 |

*Primary Examiner*—Monroe H. Hayes
*Attorney, Agent, or Firm*—Toren, McGeady and Stanger

[57] ABSTRACT

This invention relates to a composite barrel of the mount for an interchangeable lens which is to be used with a motion picture camera or still camera. An interchangeable lens barrel attachable to the camera body is divided into two sections, one of which is for the mount of a front assembly of a lens system and another section which is for the mount of a rear lens assembly thereof. The rear barrel section is constructed as including a main connector arranged at the rear end to be detachably coupled with the connector of the camera body, an intermediate connector arranged at the front end, a number of tandem connection terminals arranged in a space within the main connector for connection with the corresponding number of electric connection terminals of the camera body, a diaphragm device including drive means therefor connected to the tandem connection terminals, and the rear lens assembly including an image-forming optic arranged behind the diaphragm device. The front lens barrel section is constructed as including a connector arranged at the rear end to be detachably coupled with the intermediate connector of the rear barrel section and the front lens assembly including a focusing member and the like. Such construction and arrangement of the front and rear sections of a composite barrel permits not only the attachment and detachment of an interchangeable lens to and from the camera body but also selection of front lens assemblies of different type in the individual front barrel sections for attachment to the rear barrel section.

6 Claims, 2 Drawing Figures

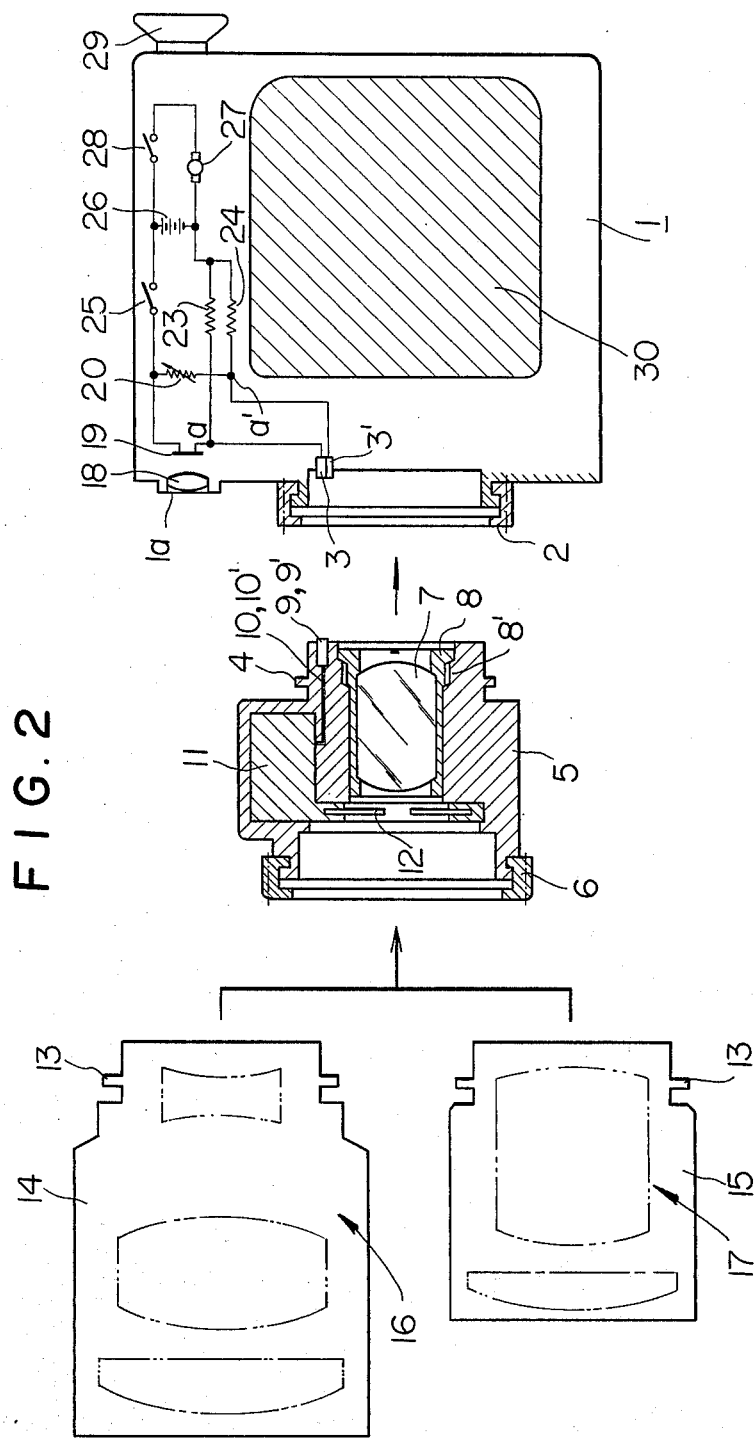

INTERCHANGEABLE LENS BARREL STRUCTURE

BACKGROUND OF THE INVENTION

1. Field of the Invention:

This invention relates to interchangeable lens barrels which are to be used with motion picture cameras and still cameras, and more particularly to the structure of a composite barrel of the mount for an interchangeable lens which barrel is composed of two distinct sections detachable from each other, one of which is for the mount of a front assembly of a lens system, and the other section which is for the mount of a rear assembly thereof, and which structure permits selection of a plurality of front lens assemblies of different types mounted in the respective front barrel sections for attachment to the rear barrel section provided with a diaphragm drive mechanism incorporated therein.

2. Description of the Prior Art:

Recently in cameras, iris blades used to form an opening to control the incidence of object light, have been positioned within the incidental optical path of the object light, and the size of opening has been made variable by controlling the iris blades so that the photographing can be made with the appropriate exposure. A method for controlling the iris blades is such that an object brightness is detected and the iris blades are controlled by such iris blades driving means as a motor or a galvanometer controlled by signal afforded by the detecting step. Interchangeable lens units housing both the iris blades and the iris blades driving means for operating the iris blades within one interchangeable lens barrel are known. Such a conventional interchangeable lens unit forms one unit having all the optical elements necessary for photographing within itself. But it is necessary for a photographer to prepare many kinds of interchangeable lenses so different arrangements of interchangeable lenses can be used as desired for attaining different photographing effects. However, a conventional interchangeable lens unit housing both the iris blades driving means within one interchangeable lens barrel will have a complicated lens unit structure as the various parts housed within it cause the manufacturing cost to go up, and the price of one interchangeable lens to become high. Therefore, when a photographer wants to photograph with various effects, he needs a number of high priced interchangeable lens units, which results in a considerable economic burden. Providng iris blades and iris blades driving mechanism within each interchangeable lens unit makes the size of the unit that much bigger and heavier, leaving a problem that the unit is inconvenient for handling.

SUMMARY OF THE INVENTION

An object of the present invention is to provide a novel structure of an interchangeable lens barrel which has overcome these conventional drawbacks.

Another object of the present invention is to provide a compact, inexpensive and reliable diaphragm drive mechanism-incorporated interchangeable lens barrel.

Still another object of the present invention is to provide an interchangeable lens barrel composite system in which an interchangeable lens barrel attachable to the camera body is divided into two sections, one of which is for the mount of a front assembly of a lens system and the other section which is for the mount of a rear lens assembly thereof, the rear barrel section being constructed as including a main connector arranged at the rear end to be detachably coupled with the connector of the camera body, an intermediate connector arranged at the front end, a number of tandem connection terminals arranged in a space within the main connector for connection with the corresponding number of electric connection terminals of the camera body, a diaphragm device including drive means therefor connected to the tandem connection terminals, and the rear lens assembly including an image-forming optic arranged behind the diaphragm device, and, on the other hand, the front lens barrel section being constructed as including a connector arranged at the rear end to be detachably coupled with the intermediate connector of the rear barrel section and the front lens assembly including a focusing member and the like, so that such construction and arrangement of the front and rear sections of the composite barrel permits not only the attachment and detachment of an interchangeable lens to and from the camera body but also the selection of front lens assemblies of different types in the individual front barrel sections for attachment to the rear barrel section.

BRIEF DESCRIPTION OF THE DRAWINGS

FIG. 2 is a schematic sectional view of an interchangeable lens barrel section assembling system in which two front barrel sections having front lens assemblies of different type are illustrated as being adaptable to the same rear barrel section.

DESCRIPTION OF THE PREFERRED EMBODIMENTS

Figure 1:
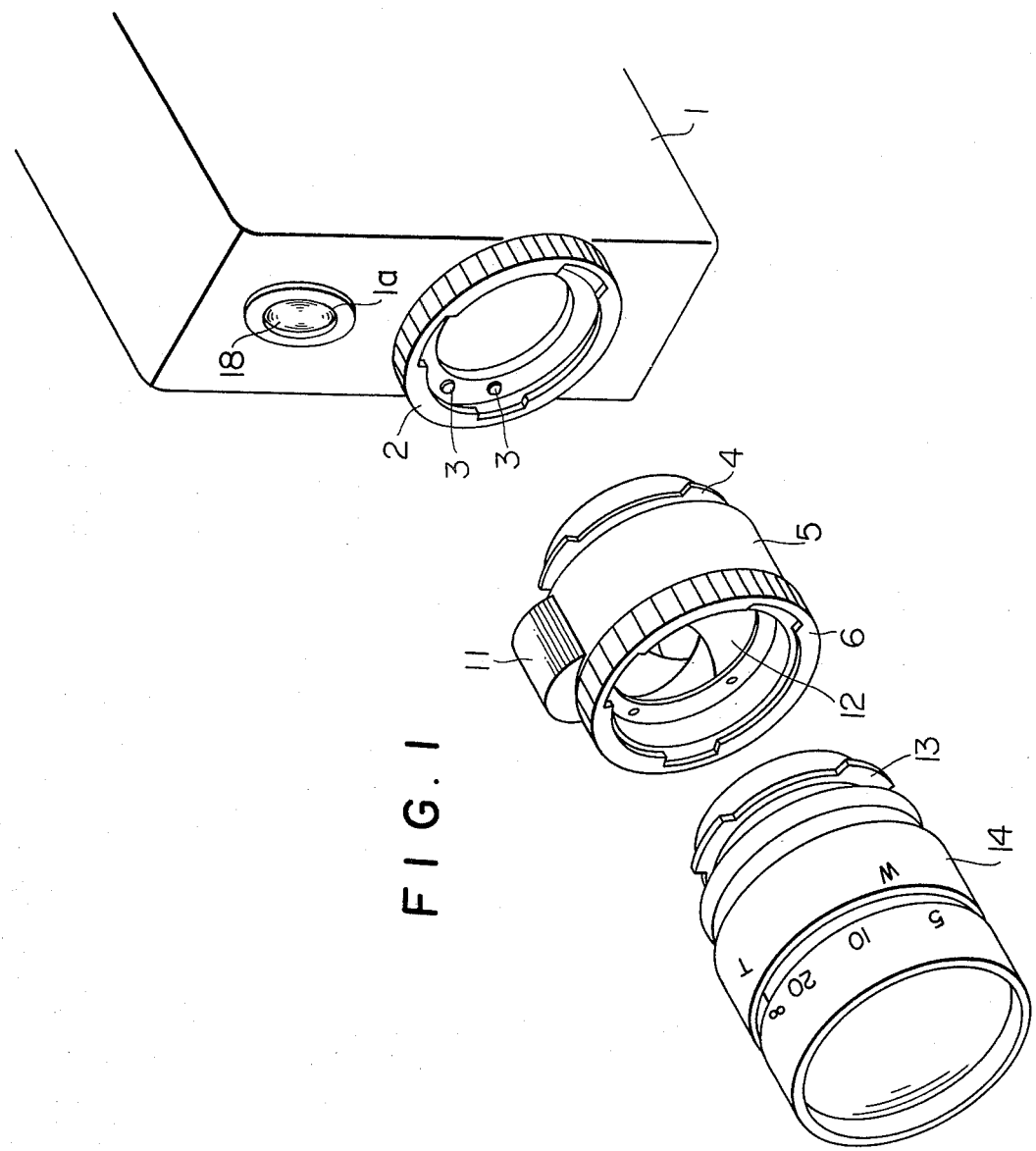
FIG. 1 is a perspective view of the front and rear sections of an interchangeable lens barrel according to the invention which are about to be coupled with each other and with a camera body.

In FIGS. 1 and 2, there is shown a camera body 1 having a window 1a provided through the housing thereof to receive photometric light, an image-forming lens 18 arranged in the window 1a and a sensor circuit. The sensor circuit comprises a photo-conductive element 19 arranged behind the image-forming lens 18 which upon exposure to an image of the object to be photographed located outside of the camera body 1 formed by the image-forming lens 18 from light entering through the window 1a produces an electric signal dependent upon the level of brightness of the object being photographed, a variable resistor 20 of which the resistance value is adjustable in accordance with the sensitivity of a photographic film in a magazine 30 associated in the camera body 1 and two fixed resistors 23 and 24, said photoconductive element 19 and said resistors 20, 23 and 24 constituting a Wheatstone bridge circuit of which the output points, $a$, and $a'$, are connected to connection terminals 3 and 3' respectively provided in a space within a lens connector portion 2 of the camera body 1. The bridge circuit is connected to a battery 26 through a switch 25 which is operable for selectively connecting and disconnecting the bridge circuit to and from the battery 26. The battery 26 also is connected to terminals of a motor 27 for driving the camera, for example, the shutter mechanism and film transport mechanism through a switch 28 which is operable for selectively connecting and disconnecting the motor 27 to and from the battery 26. These switches are arranged to be accessible to the operator from the outside of the camera. Numeral 29 indicates an eyepiece provided in the view finder not shown.

An interchangeable lens barrel is constructed as consisting of a rear section 5 and a front section 14. The rear section 5 is provided with a main connector 4 of the complete interchangeable lens barrel arranged at the rear end thereof to be detachably coupled with the connector 2 of the camera body when the interchangeable lens is attached to the camera body, an intermediate connector 6 arranged at the front end of the rear barrel section 5 for connection of the front barrel section to the rear barrel section, a diaphragm device having blades 12, the rear lens assembly such as a relay lens arranged behind the diaphragm device 12 and fixedly carried in a sleeve 8, and a pair of electric connection terminals 9 and 9' arranged in a space within the main connector to be connected to the connection terminals 3 and 3', respectively, of the camera body when the rear lens barrel section is attached to the camera body. The rear lens barrel section is further provided with a diaphragm drive device 11 associated with a motor or galvanometer having terminals connected through the respective leads 10' to the electric connection terminals 9 and 9' upon connection of the terminals 9 and 9' to the terminal 3 and 3' to control the diaphragm blades 12 in response to the output signal from the sensor circuit so as to adjust the size of diaphragm aperture in accordance with the light value sensed by the photoconductive element 19. The rear lens assembly-carrying sleeve has an externally screw-threaded portion 8' cooperatively engaged with a screw-thread 5' of the barrel 5 to be interchanged with a different type of rear lens assembly. The rear lens assembly 7 in the rear barrel section 5 may be equipped with a plurality of interchangeable front lens assemblies known in the art such as those of varifocal lens system 16 and unifocal lens system 17 and mounted in their respective front barrel sections 14 and 15 as shown in FIG. 2. Each of the different front barrel sections 14 and 15 is provided with a connector 13, 13', respectively arranged at the rear end thereof to be detachably coupled with the intermediate connector 6 of the rear barrel section 5.

The front and rear barrel sections of the construction described above are coupled with each other at their adjoining connectors 6 and 13, 13' forming an intermediate mount to complete an interchangeable lens which when coupled with the camera body 1 at their adjoining connectors 4 and 2 to effect the connection of the diaphragm drive device 11 to the output terminals of the bridge circuit of the camera body provides an automatic diaphragm control system for the camera. In interchanging the lens system of the camera with another while maintaining the automatic diaphragm control system, the operator needs only to operate the intermediate mount of the connectors 6 and 13. If he desired to use an interchangeable lens with a manual diaphragm mechanism, this interchangeable lens may be attached to the camera body at the connector portion 2.

In the embodiment of the present invention which has been described in connection with a schematic example shown in FIGS. 1 and 2, it is preferred that the exposure control circuit associated with the sensor circuit for controlling the diaphragm drive device 11 is incorporated in the camera body. The example can be changed in many ways. For example, instead of incorporating the sensor circuit in the camera body, it is possible to incorporate an exposure control circuit including the sensor circuit in the rear lens barrel section 5 in such a manner that a photoconductive element 19 is arranged in the rear lens barrel section 5 to receive photometric light from the object being photographed, and the sensor circuit is arranged in the diaphragm drive device 11. In this case, it is preferred to utilize the battery 26 in the camera body as a power source of the exposure control circuit incorporated in the rear barrel section 5 through the intermediary of the leads 10 10' and the connection terminals 3, 3', 9 and 9'.

When a camera using the lens barrel structure of the present invention is pointed toward an object, object light outside of the camera is incident on the photoconductive element 19 for photo-sensing through the window 1a. As the object light is incident on the photoconductive element 19, the resistance value is varied. Since the element 19 forms one side of the bridge circuit for determining allowable incident light amount, when the object brightness is different from the reference brightness, the state of equilibrium in the bridge circuit is broken and a corresponding signal is generated at the output terminals $a,a'$. The output signal from the bridge circuit is inputted into the diaphragm drive device through connection terminals 9,9' and leads 10,10'. The device 11 is operated for a time corresponding to the bridge circuit output signal, and the blades 12 are activated in association with the operation of the diaphragm drive device 11. Thus, the size of the aperture allowing the passage of object light within the lens unit will be the aperture of such size as desired for photographing the object.

It will be seen from the foregoing description that the described embodient of the present invention accomplishes the above-mentioned objects by constructing the barrel of the mount for an interchangeable lens associated with a diaphragm mechanism which is automatically controlled as consisting of two distinct sections of which the rear section carries the diaphragm mechanism and the front section which carries no complicated mechanism but a front lens assembly, these barrel sections being detachably coupled with each other so that when interchanging the lens system of the camera, there is no need to operate the hardly-manageable, complicated and expensive rear barrel section, but it is only required to operate the front lens barrel section provided that the interchangeable lenses which are to be used with the camera body have a common rear lens assembly. The provision for interchanging the rear lens assembly is made in the sleeve assembly 8 and 8', giving to the interchangeable lens barrel system of the invention an additional advantage of permitting the automatically controllable diaphargm device to be unremoved from the rear barrel section when interchanging the rear lens assembly, with another one.

What is claimed is:

1. An improvement in a camera system comprising in combination:

a camera unit housing having an opening at a front plane thereof for allowing incident light into said housing; a first attaching and detaching means positioned near said opening; a power source provided within said camera unit housing; an object brightness detection means for detecting the brightness of an object outside of said camera unit housing, said detection means being provided within said camera unit housing and electrically connected with said power source; a circuit for determining the amount of light entering said housing, said circuit being provided within said housing and electrically connected to said detection means in order to generate a signal corresponding to the output of said detection means; and a first electric connector means having a first end connected to the output of said circuit and a second end connected to said first attaching and detaching means; an interchangeable lens unit which can be selectively attached to or detached from said camera unit housing comprising a rear barrel section having a first and second open end; a lens system mounted within said rear barrel section; second attaching and detaching means mounted on said first end of said rear barrel section for attaching said rear barrel section to said first attaching and detaching means; a third attaching and detaching means mounted on said second end of said rear barrel section; blades mounted in said rear barrel section forming an opening allowing the passage of light therethrough, said opening being variable to control the amount of light passing therethrough; driving means for said blades for controlling the opening formed thereby; a second electric connector means having a first end connected to said driving means and a second end connected to said second attaching and detaching means; a front barrel section for selective attachment to or detachment from said rear barrel section having a first and second open end; a photographing optical system positioned within said front barrel section; a forth attaching and detaching means mounted on said first end of said front barrel section for engagement with said third attaching and detaching means so that said front barrel section may be secured to or removed from said rear barrel section, whereby said driving means is controlled by the output from said cicuit and the amount of light entering the camera housing through said front barrel section is controlled.

2. The system according to claim 1, wherein said object brightness detection means comprises a photoconductive element.

3. The system according to claim 2, wherein said circuit comprises a bridge circuit having said photoconductive element therein.

4. An improvement in a camera system comprising, in combination:
a camera unit housing having a first and a second opening at a front plane thereof for allowing incident light into said housing; a first attaching and detaching means positioned near said first opening; a power source positioned within said housing; light control means for determining the amount of light allowed through said first opening mounted within said housing and comprising a photoconductive element positioned near said second opening; a bridge circuit having said photoconductive element therein; and an electric connector means having a first end connected to the output of said bridge circuit and a second end connected to said first attaching and detaching means; a rear barrel section having a first and second end and including a lens system; a second attaching and detaching means mounted on said first end for selective attachment to and detachment from said first attaching and detaching means; a third attaching and detaching means mounted on said second end; blades mounted in said barrel section forming an opening allowing the passage of light therethrough; driving means for said blades connected to said blades; and a second electrical connector means having a first end connected to said blades and a second end connected to said second attaching and detaching means; and a front barrel section for selective attachment to or detachment from said rear barrel section comprising an optical photographing system; a fourth attaching and detaching means engageable with said third attaching and detaching means, whereby said driving means is controlled in response to the output from said bridge circuit thus controlling the amount of light entering through said second opening.

5. An interchangeable lens unit being selectively attachable to or detachable from a camera housing having a light controlling circuit which detects the brightness of an object outside of the camera housing for determining the amount of light entering the camera housing, a power source for supplying current to said circuit, an attaching and detaching means, and an electric connector means having one end conncted to said circuit and another end connected to said attaching and detaching means comprising: a lens unit housing of cylindrical shape having a first and second open end; a lens system within said housing; a first attaching and detaching means positioned on said first end for engagement with the attaching and detaching means of the camera housing; a second attaching and detaching means positioned on said second end; blades for forming an opening in order to allow the light from an object to pass therethrough, said opening being variable; driving means for controlling the movement of said blades to vary the size of said opening; and electrical connector means having a first end connected to said driving means and a second end connected to said first attaching and detaching means, whereby said driving means is activated in correspondence with the output from said circuit.

6. An interchangeable lens unit being selectively attached to or detached from an attaching and detaching means of a camera housing having a light controlling circuit for detecting the brightness of an object outside of the camera housing for determining the amount of light entering the camera housing, a power source for supplying current to said circuit, and electric connector means having one end connected to said circuit and another end connected to said attaching and detaching means comprising: a lens unit housing of cylindrical shape having a first and a second open end; a lens system; a sleeve assembly of cylindrical shape for retaining said lens system; a first attaching and detaching means selectively engageable with the attaching and detaching means of the camera housing mounted on said first end; a second attaching and detaching means for engagement with a front lens unit; blades for forming an opening in order to allow the light from an object to pass therethrough, said opening being variable; driving means for controlling the movement of said blades to vary the size of said opening; and electric connector means having a first end connected to said driving means and a second end connected to said first attaching and detaching means, whereby said driving means is activated in correspondence with the output from said circuit.

* * * * *